United States Patent
Gao

(10) Patent No.: US 11,915,009 B2
(45) Date of Patent: Feb. 27, 2024

(54) METHOD FOR ACQUIRING APPLICATION, APPARATUS, AND COMPUTER-READABLE STORAGE MEDIUM

(71) Applicant: ZTE Corporation, Shenzhen (CN)

(72) Inventor: Duo Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 220 days.

(21) Appl. No.: 17/608,368

(22) PCT Filed: Apr. 2, 2020

(86) PCT No.: PCT/CN2020/082963
§ 371 (c)(1),
(2) Date: Nov. 2, 2021

(87) PCT Pub. No.: WO2020/248666
PCT Pub. Date: Dec. 17, 2020

(65) Prior Publication Data
US 2022/0229672 A1 Jul. 21, 2022

(30) Foreign Application Priority Data
Jun. 10, 2019 (CN) .......................... 201910498474.6

(51) Int. Cl.
G06F 9/00 (2006.01)
G06F 9/4401 (2018.01)
G06F 9/451 (2018.01)
G06F 3/0482 (2013.01)
G06F 13/10 (2006.01)

(52) U.S. Cl.
CPC .......... *G06F 9/4411* (2013.01); *G06F 3/0482* (2013.01); *G06F 9/451* (2018.02); *G06F 13/102* (2013.01)

(58) Field of Classification Search
CPC ...... G06F 9/4411; G06F 9/451; G06F 9/4415; G06F 13/102; G06F 13/10; G06F 3/0482
See application file for complete search history.

(56) References Cited

U.S. PATENT DOCUMENTS

| 2014/0059494 | A1  | 2/2014 | Lee et al. |            |
|--------------|-----|--------|------------|------------|
| 2016/0210026 | A1* | 7/2016 | Chun       | G06F 3/04886 |
| 2017/0127203 | A1* | 5/2017 | Ryu        | H04R 5/04  |

FOREIGN PATENT DOCUMENTS

| CN | 102394980 A | 3/2012 |
| CN | 103136130 A | 6/2013 |

(Continued)

OTHER PUBLICATIONS

The State Intellectual Property Office of People's Republic of China. First Office Action for CN Application No. 2019104984746 and English translation, dated Aug. 12, 2022, pp. 1-8.

(Continued)

*Primary Examiner* — Nitin C Patel
(74) *Attorney, Agent, or Firm* — Vivacqua Crane, PLLC

(57) ABSTRACT

Disclosed are a method, an apparatus, and a non-transitory computer-readable storage medium for obtaining applications. The method includes: identifying an external device connected to an interface according to states of pins of the interface; identifying applications which require to use the external device connected to the interface; and displaying at least one of the applications identified.

9 Claims, 2 Drawing Sheets

(56) References Cited

FOREIGN PATENT DOCUMENTS

| | | |
|---|---|---|
| CN | 104903858 A | 9/2015 |
| CN | 105739943 A | 7/2016 |
| CN | 106603755 A | 4/2017 |
| CN | 108268395 A | 7/2018 |

OTHER PUBLICATIONS

The State Intellectual Property Office of People's Republic of China. First Search Report for CN Application No. 2019104984746 and English translation, dated Aug. 5, 2022, pp. 1-5.
International Searching Authority. International Search Report and Written Opinion for PCT Application No. PCT/CN2020/082963 and English translation, dated Jul. 8, 2020, pp. 1-9.

\* cited by examiner

METHOD FOR ACQUIRING APPLICATION, APPARATUS, AND COMPUTER-READABLE STORAGE MEDIUM

CROSS-REFERENCE TO RELATED APPLICATION

This application is a national stage filing under 35 U.S.C. § 371 of international application number PCT/CN2020/082963, filed Apr. 2, 2020, which claims priority to Chinese patent application No. 201910498474.6, filed Jun. 10, 2019. The contents of these applications are incorporated herein by reference in their entirety.

TECHNICAL FIELD

Embodiments of the present disclosure relate to, but not limited to, terminal device technologies, and particularly to a method, an apparatus, and a non-transitory computer-readable storage medium for obtaining applications.

BACKGROUND

With the rapid development of the mobile Internet, there are an increasing number of applications (APPs) appearing in mobile phones. According to the statistics by AURORA Big Data, in the first quarter of 2017 alone, the average number of APPs in a high-end mobile phone has reached 56. The increase in the number of APPs will undoubtedly increase the time and reduce the accuracy for users to search APPs, thus leading to worse user experience. Some existing solutions may include: sorting APPs according to the order or the reverse order of initials of APP names; sorting APPs according to the user's usage frequency or installation time; sorting APPs according to a user-defined gesture or a user-defined sort order; and so on. Although these methods can help users find the required APP to a certain extent, in specific occasions, it is not convenient enough. For example, the interfaces for smart phone are getting fewer, especially on medium- and high-end mobile phones, in other words, the technical schemes of integrating various functions such as fast charging, earphones, data transmission, On-The-Go (OTG), High Definition Multimedia Interface (HDMI), and even network port, mouse, keyboard and gamepad into a Type_C interface are common now. And the interface rate has reached 10 Gbps. When a user needs to use a USB flash drive reading function based on the OTG interface, a conventional way is to insert an OTG line and a USB flash drive, and then find out the file management application among the APPs installed in the mobile phone before performing related operations. Similarly, when using other functions of the Type_C interface, e.g. earphones, a user needs to find the required one among the APPs. This method is just like searching a needle in a haystack, which undoubtedly reduces the search efficiency, consumes the user's time, and makes the user experience worse.

SUMMARY

The embodiments of the present disclosure provide a method, an apparatus, and a non-transitory computer-readable storage medium for obtaining applications, improving the efficiency of obtaining applications corresponding to an external device connected to an interface when connecting the external device to the interface, thus reducing searching time and improving user experience.

The embodiments of the present disclosure provide a method for obtaining applications, the method may include identifying an external device connected to an interface according to states of pins of the interface; identifying applications which require to use the external device connected to the interface; and displaying at least one of the applications identified.

The embodiments of the present disclosure provide an apparatus for obtaining applications, the apparatus may include a processor and a memory, storing instructions, the instructions, when executed, causes the processor to carry out the method for obtaining applications.

The embodiments of the present disclosure provide a non-transitory computer-readable storage medium. The non-transitory computer-readable storage medium stores a computer program, which, when executed, causes the processor to carry out method for obtaining applications.

The embodiments of the present disclosure provide an apparatus for obtaining applications. the apparatus may include a first identification module, configured to identify an external device connected to an interface according to states of pins of the interface; a second identification module, configured to identify applications which require to use the external device connected to the interface; and a display module, configured to display at least one of the applications identified.

Other features and advantages of the embodiments of the present disclosure will be set forth in the description which follows, and may partly become obvious from the description, or may be understood by implementing the embodiments of the present disclosure. The objects and other advantages of the embodiments of the present disclosure may be implemented and obtained by the structures particularly specified in the description, claims and drawings.

BRIEF DESCRIPTION OF DRAWINGS

The drawings are provided for a further understanding of the technical schemes of the embodiments of the present disclosure, and constitute a part of the description. The drawings and the embodiments of the present disclosure are used to explain the technical schemes of the embodiments of the present disclosure, and do not constitute a restriction on the technical schemes of the embodiments of the present disclosure.

DETAILED DESCRIPTION

Hereinafter, the embodiments of the present disclosure will be described in detail with reference to the drawings. It is to be noted that the embodiments in the present disclosure and characteristics in the embodiments may be combined to derive other embodiments not explicitly described.

The steps shown in the flowcharts of the drawings may be executed in a computer system, such as a group of computer-executable instructions. And, although a logical order is shown in the flowchart, in some cases, the steps shown or described may be executed in a different order from that here.

Figure 1:
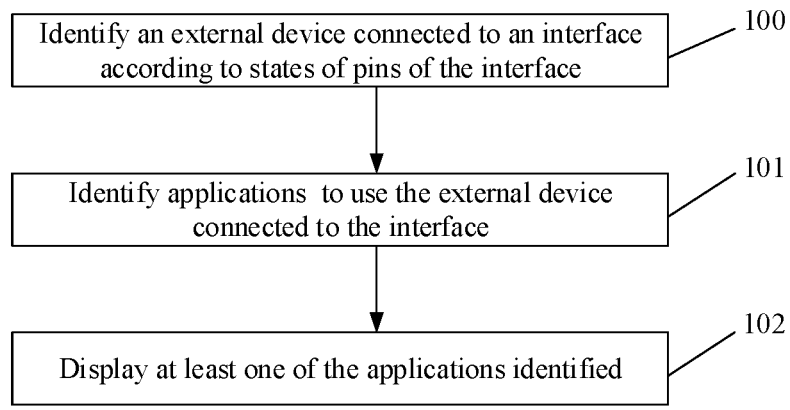
FIG. 1 is a schematic flowchart of a method for obtaining applications according to an embodiment of the present disclosure.

Referring to FIG. 1, an embodiment of the present disclosure provides a method for obtaining applications. The method includes the following steps.

In a step of 100, an external device connected to an interface is identified according to states of pins of the interface.

In the embodiment of the present disclosure, pin definitions of a Type_C interface are shown in Table 1, and a total of 24 pins are provided, i.e. pins A1-A12 and B1-B12, and different pins have different definitions. For example, the signal on pin A1 is defined as GND1 signal, the signal on pin A2 is defined as TX1+ signal, the signal on pin A3 is defined as TX1− signal, the signal on pin A4 is defined as Vbus1 signal, the signal on pin A5 is defined as CC1 signal, the signal on pin A6 is defined as D1+ signal, the signal on pin A7 is defined as D1− signal, the signal on pin A8 is defined as SBU1 signal, the signal on pin A9 is defined as Vbus2 signal, the signal on pin A10 is defined as RX2− signal, the signal on pin A11 is defined as RX2+ signal, the signal on pin A12 is defined as GND2 signal, the signal on pin B1 is defined as GND3 signal, the signal on B2 is defined as TX2+ signal, the signal on pin B3 is defined as TX2− signal, the signal on pin B4 is defined as Vbus3 signal, the signal on pin B5 is defined as CC2 signal, the signal on pin B6 is defined as D2+ signal, the signal on pin B7 is defined as D2− signal, the signal on pin B8 is defined as SBU2 signal, the signal on pin B9 is defined as Vbus4 signal, the signal on pin B10 is defined as RX1− signal, the signal on pin B11 is defined as RX1+ signal, and the signal on pin B12 is defined as GND4 signal.

TABLE 1

| A1 | A2 | A3 | A4 | A5 | A6 | A7 | A8 | A9 | A10 | A11 | A12 |
|---|---|---|---|---|---|---|---|---|---|---|---|
| GND1 | TX1+ | TX1− | Vbus1 | CC1 | D1+ | D1− | SBU1 | Vbus2 | RX2− | RX2+ | GND2 |
| GND4 | RX1+ | RX1− | Vbus4 | SBU2 | D2− | D2+ | CC2 | Vbus3 | TX2− | TX2+ | GND3 |
| B12 | B11 | B10 | B9 | B8 | B7 | B6 | B5 | B4 | B3 | B2 | B1 |

Different pins have different functions. For example, TX/RX signals are two groups of differential signals for data transmission. CC1/CC2 signals are two key signals, which have many functions. For example, CC1/CC2 signals are used to detect connections and distinguish downstream facing port (DFP) from upstream facing port (UFP); configure Vbus1 and Vbus2 signals, or Vbus3 and Vbus4 signals (USB Type_C mode and USB power delivery mode are provided); configure Vconn, when a chip is provided in the cable, one CC transmits the signal and one CC becomes a power supply Vconn; and configure other modes, audio accessories, and so on.

In some embodiments, the step of identifying an external device connected to an interface according to states of pins of the interface includes one or more of the following steps:

determining that the external device is an external storage device when detecting that a CC1 signal on a pin A5 or a CC2 signal on a pin B5 of the interface is pulled down to ground;

determining that the external device is an earphone when detecting that a CC1 signal on a pin A5 or a CC2 signal on a pin B5 of the interface is an earphone detection (DET) signal;

determining that the external device is a device supporting a HDMI input of a high-definition multimedia interface when detecting a CC2 signal on a pin B5, a RX1+ signal on a pin B11, a RX1− signal on a pin B10, a TX2+ signal on a pin B32, a TX2− signal on a pin B3, a Vbus3 signal on a pin B4 and a Vbus4 signal on a pin B9, or when detecting the CC1 signal on the pin A5, a RX2+ signal on a pin A11, a RX2− signal on a pin A10, a TX1+ signal on a pin A2, a TX1− signal on a pin A3, a Vbus1 signal on a pin A4 and a Vbus2 signal on a pin A9; devices that support the HDMI input include monitors, televisions, projectors, and large vehicle-mounted screens;

determining that the external device is a charging device when detecting that a CC1 signal on a pin A5, a Vbus1 signal on a pin A4, a Vbus2 signal on a pin A9, a GND1 signal on a pin A1 and a GND2 signal on a pin A12 of the interface are charging signals, or when detecting a CC2 signal on a pin B5, a Vbus3 signal on a pin B4, a Vbus4 signal on a pin B9, a GND3 signal on a pin B1 and a GND4 signal on a pin B12 are charging signals; and determining that the external device is a data transmission device when detecting a CC1 signal on a pin A5, a D1+ signal on a pin A6, a D1− signal on a pin A7, a SBU1 signal on a pin A8, the Vbus1 signal on the pin A4 and the Vbus2 signal on the pin A9 of the interface, or when detecting a CC2 signal on a pin B5, a D2+ signal on a pin B6, a D2− signal on a pin B7, a SBU2 signal on a pin B8, a Vbus3 signal on a pin B4 and a Vbus4 signal on a pin B9.

The pin functions of the interface may not be limited to the functions listed above, and other functions may also be processed in the same manner, which is not limited by the embodiments of the present disclosure.

In a step of 101, the applications to use the external device connected to the interface are identified.

In some embodiments, the step identifying the applications to use the external device connected to the interface includes one or more of the following steps:

determining that the applications to use the external storage device are applications to call an online OTG function when the external device is an external storage device, such as file management, setting and other applications;

determining that the applications to use the earphone are applications to call an earphone function when the external device is an earphone, such as music, radio, telephone, video and other applications;

determining that the applications to use a device supporting a HDMI input are applications to call a HDMI function when the external device is a device using a HDMI function, such as video, photo album, music, settings and other applications;

determining that the applications to use a charging device are N applications with the largest power consumption when the external device is a charging device, where the application list may be read by calling the getPackageManager ( ) function; and determining that the applications to use a data transmission device are applications to call a data transmission function when the external device is a data transmission device, such as file management, photo album and other applications.

The power consumption of the applications and the functions that the applications need to call may be obtained from the basic information of the applications obtained by the ApplicationInfo ( ) function, that is to say, the basic information of the applications obtained by the ApplicationInfo ( ) function includes the power consumption of the applications and the functions needing to be called.

In another embodiment, when the external device is a charging device, the method further includes displaying the remaining power.

In a step of 102, at least one of the applications identified are displayed.

In an embodiment, displaying at least one of the applications identified includes one of the following steps:
- displaying at least one of the identified applications according to an order or a reverse order of the user's usage habits;
- displaying at least one of the identified applications according to an order or a reverse order of initials of names of the applications; and
- displaying at least one of the identified applications according to a user-defined sort order.

In an embodiment, the user's usage habits include, for example, usage frequency, usage duration, usage time, and so on.

Figure 2A:
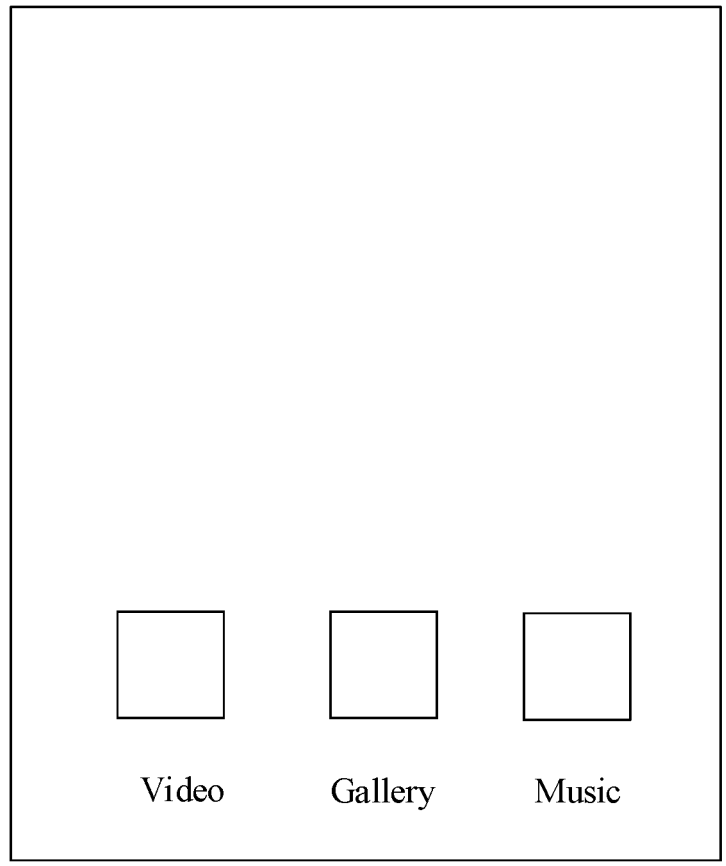
FIG. 2a is a schematic diagram for displaying applications according to an embodiment of the present disclosure.

In an embodiment of the present disclosure, when the applications are being displayed, the icons and names of the applications may be displayed, as shown in FIG. 2a. The icons of the applications may be obtained by calling the android:icon function, and the names of the applications may be obtained by calling the android: label function.

Figure 2B:
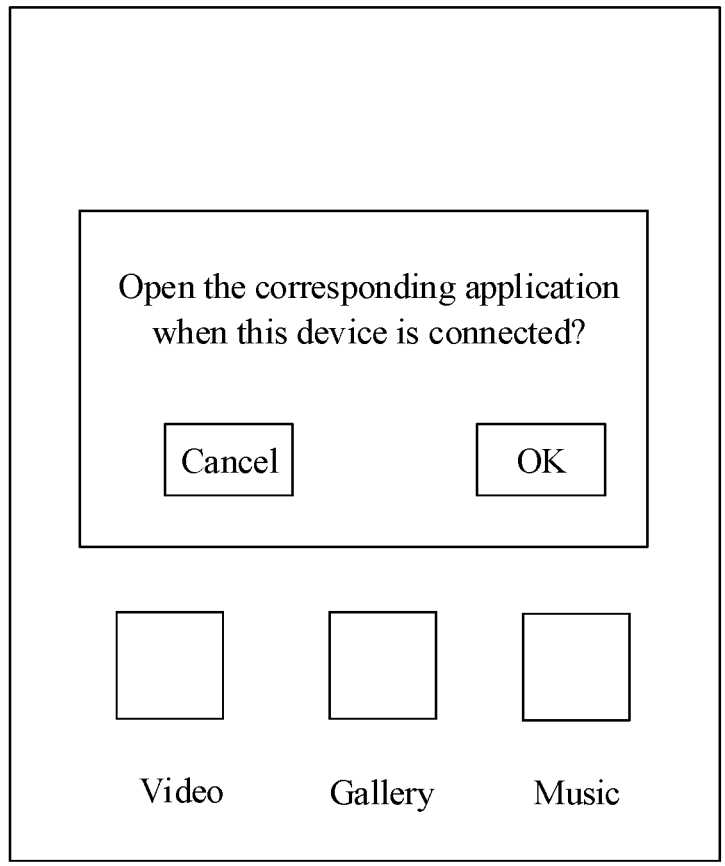
FIG. 2b is a schematic diagram showing a pop-up dialog box asking the user whether to display applications according to an embodiment of the present disclosure.

In another embodiment of the present disclosure, after determining applications needing to use the external device connected to the interface, the method further includes:
- displaying a prompt for asking a user whether to display the applications, as shown in FIG. 2b, a dialog box pops up to ask the user whether to display the corresponding application; and
- displaying at least one of the applications identified when a confirmation instruction is received.
- when a cancel instruction is received, the process is terminated.

According to the embodiment of the present disclosure, the applications to use the external device connected to the interface are displayed for the user to select, and the user does not need to search the corresponding applications by himself/herself, such that the efficiency of obtaining the applications corresponding to the external device connected to the interface is improved, the searching time is reduced, and the user experience is improved.

Figure 3:
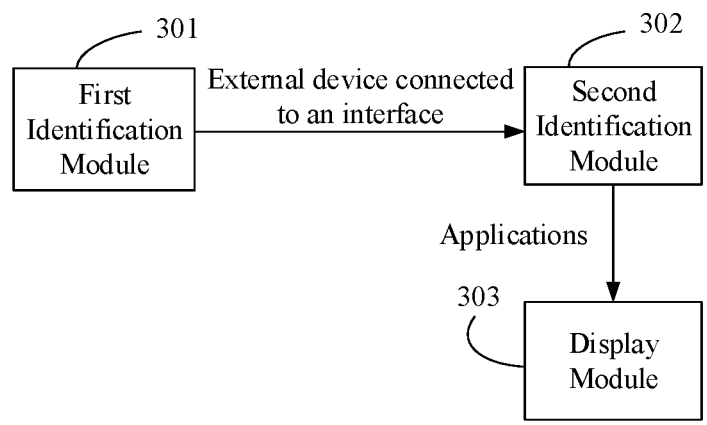
FIG. 3 is a schematic diagram of an apparatus for obtaining applications according to an embodiment of the present disclosure.

Referring to FIG. 3, another embodiment of the present disclosure provides an apparatus for obtaining applications. The apparatus includes:
- a first determining module 301, configured to identify an external device connected to an interface according to states of pins of the interface;
- a second determining module 302, configured to identify applications to use the external device connected to the interface; and
- a display module 303, configured to display at least one of the applications identified.

In the embodiment of the present disclosure, the pin definitions of the Type_C interface are shown in Table 1, and a total of 24 pins are provided, namely pins A1-A12 and B1-B12, and different pins have different definitions. For example, the signal on pin A1 is defined as GND1 signal, the signal on pin A2 is defined as TX1+ signal, the signal on pin A3 is defined as TX1− signal, the signal on pin A4 is defined as Vbus1 signal, the signal on pin A5 is defined as CC1 signal, the signal on pin A6 is defined as D1+ signal, the signal on pin A7 is defined as D1− signal, the signal on pin A8 is defined as SBU1 signal, the signal on pin A9 is defined as Vbus2 signal, the signal on pin A10 is defined as RX2− signal, the signal on pin A11 is defined as RX2+ signal, the signal on pin A12 is defined as GND2 signal, the signal on pin B1 is defined as GND3 signal, the signal on B2 is defined as TX2+ signal, the signal on pin B3 is defined as TX2− signal, the signal on pin B4 is defined as Vbus3 signal, the signal on pin B5 is defined as CC2 signal, the signal on pin B6 is defined as D2+ signal, the signal on pin B7 is defined as D2− signal, the signal on pin B8 is defined as SBU2 signal, the signal on pin B9 is defined as Vbus4 signal, the signal on pin B10 is defined as RX1− signal, the signal on pin B11 is defined as RX1+ signal, and the signal on pin B12 is defined as GND4 signal.

Different pins have different functions. For example, TX/RX signals are two groups of differential signals for data transmission. CC1/CC2 signals are two key signals, which have many functions. For example, CC1/CC2 signals are used to detect connections and distinguish DFP and UFP; configure Vbus1 and Vbus2 signals, or Vbus3 and Vbus4 signals (there are USB Type_C mode and USB power delivery mode); configure Vconn, when a chip is provided in the cable, one CC transmits the signal and one CC becomes a power supply Vconn; and configure other modes, audio accessories, and so on.

In an embodiment, the first determining module 301 is configured to carry out one or more of the following steps:
- determining that the external device is an external storage device when detecting that a CC1 signal on a pin A5 or a CC2 signal on a pin B5 of the interface is pulled down to ground;
- determining that the external device is an earphone when detecting that a CC1 signal on a pin A5 or a CC2 signal on a pin B5 of the interface is an earphone detection (DET) signal;
- determining that the external device is a device supporting a HDMI input of a high-definition multimedia interface when detecting a CC2 signal on a pin B5, a RX1+ signal on a pin B11, a RX1− signal on a pin B10, a TX2+ signal on a pin B32, a TX2− signal on a pin B3, a Vbus3 signal on a pin B4 and a Vbus4 signal on a pin B9, or when detecting a CC1 signal on a pin A5, a RX2+ signal on a pin A11, a RX2− signal on a pin A10, a TX1+ signal on a pin A2, a TX1− signal on a pin A3, a Vbus1 signal on a pin A4 and a Vbus2 signal on a pin A9; devices that support the HDMI input include monitors, televisions, projectors, and large vehicle-mounted screens;
- determining that the external device is a charging device when detecting that a CC1 signal on a pin A5, a Vbus1 signal on a pin A4, a Vbus2 signal on a pin A9, a GND1 signal on a pin A1 and a GND2 signal on a pin A12 of the interface are charging signals, or when detecting a CC2 signal on a pin B5, a Vbus3 signal on a pin B4, a Vbus4 signal on a pin B9, a GND3 signal on a pin B1 and a GND4 signal on a pin B12 are charging signals; and
- determining that the external device is a data transmission device when detecting a CC1 signal on the a A5, a D1+ signal on a pin A6, a D1− signal on a pin A7, a SBU1 signal on a pin A8, a Vbus1 signal on a pin A4 and a Vbus2 signal on a pin A9 of the interface, or when detecting a CC2 signal on a pin B5, a D2+ signal on a pin B6, a D2− signal on a pin B7, a SBU2 signal on a pin B8, the Vbus3 signal on the pin B4 and the Vbus4 signal on the pin B9.

The pin functions of the interface may not be limited to the functions listed above, and other functions may also be processed in the same manner, which is not limited by the embodiments of the present disclosure.

In an embodiment, the second determining module 302 is configured to carry out one or more of the following steps:
  determining that the applications to use the external storage device are applications to call an online OTG function, when the external device is an external storage device, such as file management, settings and other applications;
  determining that the applications to use the earphone are applications to call an earphone function, when the external device is an earphone, such as music, radio, telephone, video and other applications;
  determining that the applications to use a device supporting a HDMI input are applications to call a HDMI function, when the external device is a device using a HDMI function, such as video, photo album, music, settings and other applications;
  determining that the applications to use a charging device are N applications with the largest power consumption, when the external device is a charging device, where the application list may be read by calling getPackageManager ( ) function; and
  determining that the applications to use a data transmission device are applications to call a data transmission function, when the external device is a data transmission device, such as file management, photo album and other applications.

The power consumption of the applications and the functions that the applications need to call may be obtained from the basic information of the applications obtained by the ApplicationInfo ( ) function, that is to say, the basic information of the applications obtained by the ApplicationInfo ( ) function includes the power consumption of the applications and the functions to be called.

In another embodiment, the display module 303 is further configured to display the remaining power when the external device is a charging device.

In an embodiment, the display module 303 is configured to carry out one of the following steps:
  displaying at least one of the applications identified according to an order or a reverse order of the user's usage habits;
  displaying at least one of the applications identified according to an order or a reverse order of initials of names of the applications; and
  displaying at least one of the applications identified according to a user-defined sort order.

In an exemplary embodiment, the user's usage habits include, for example, usage frequency, usage duration, usage time, and so on.

In an embodiment of the present disclosure, when the applications are being displayed, the icons and names of the applications may be displayed, as shown in FIG. 2a. The icons of the applications may be obtained by calling the android:icon function, and the names of the applications may be obtained by calling the android: label function.

In another embodiment of the present disclosure, after the second determining module 302 identifies the applications to use the external device connected to the interface, the display module 303 displays a prompt for asking the user whether to display the applications. As shown in FIG. 2b, a dialog box pops up to ask the user whether to display the corresponding applications. At least one of the applications identified are displayed when a confirmation instruction is received.

When a cancel instruction is received, the process ends.

According to the embodiment of the present disclosure, the applications to use the external device connected to the interface are displayed for the user to select, and the user does not need to search the corresponding applications by himself/herself, such that the efficiency of obtaining the applications corresponding to the external device connected to the interface is improved, the searching time is reduced, and the user experience is improved.

It can be understood by those having ordinary skill in the art that, functional modules/units in all or some of the steps, the systems, and the apparatuses in the methods disclosed above may be implemented as software, firmware, hardware, and appropriate combinations thereof. In the implementations by hardware, the division between functional modules/units mentioned in the above description does not necessarily correspond to the division of physical components. For example, a physical component may have multiple functions, or a function or a step may be cooperatively executed by several physical components. All or part of the components may be implemented as software executed by a processor, such as a digital signal processor or a microprocessor, or as hardware, or as an integrated circuit, such as an application-specific integrated circuit. Such software may be distributed on a computer-readable medium, and the computer-readable medium may include a computer storage medium (or a non-transitory medium) and a communication medium (or a transitory medium). As is well known to those having ordinary skill in the art, the term "computer storage medium" includes volatile and nonvolatile, removable and non-removable media implemented in any method or technology for storing information such as computer-readable instructions, data structures, program modules or other data. The computer storage media include but are not limited to RAM, ROM, EEPROM, flash memory or other memory technologies, CD-ROM, digital versatile disk (DVD) or other optical disk storage, magnetic boxes, magnetic tapes, magnetic disk storage or other magnetic storage devices, or any other media that may be used to store desired information and may be accessed by a computer. Further, it is well known to those having ordinary skill in the art that the communication media typically contain computer-readable instructions, data structures, program modules or other data in a modulated data signal such as carrier waves or other transmission mechanisms, and may include any information delivery media.

Although the implementations disclosed in the embodiments of the present disclosure are as described above, the contents described are only the implementations for facilitating the understanding of the embodiments of the present disclosure, and are not intended to limit the embodiments of the present disclosure. Those having ordinary skills in the field of the embodiments of the present disclosure may make any modifications and changes in the forms and details of implementation without departing from the principle and scope disclosed by the embodiments of the present disclosure. The scope of patent protection of the embodiments of the present disclosure shall still be subject to the scope defined by the appended claims.

What is claim are:

1. A method for obtaining applications, comprising:
identifying an external device connected to an interface according to states of pins of the interface;
identifying applications which require to use the external device connected to the interface; and
displaying at least one of the applications identified;
wherein identifying applications which require to use the external device connected to the interface comprises at least one of following steps:
determining that the applications which require to use the external storage device are applications to call an online On-The-Go (OTG) function, in response to the external device being an external storage device;
determining that the applications which require to use the earphone are applications to call an earphone function, in response to the external device being an earphone;
determining that the applications which require to use a device supporting a HDMI input are applications to call a HDMI function, in response to the external device being a device using a HDMI function;
determining that the applications which require to use a charging device are N applications with the largest power consumptions, in response to the external device being a charging device; and
determining that the applications which require to use a data transmission device are applications to call a data transmission function, in response to the external device being a data transmission device.

2. The method of claim 1, after identifying applications which require to use the external device connected to the interface, the method further comprising:
displaying a prompt for asking a user whether to display the applications; and
displaying at least one of the applications identified, in response to a confirmation instruction being received.

3. The method of claim 1, wherein identifying an external device connected to an interface according to states of pins of the interface comprises at least one of following steps:
determining that the external device is an external storage device, in response to identifying that a CC1 signal on a pin A5 or a CC2 signal on a pin B5 of the interface is pulled down to ground;
determining that the external device is an earphone, in response to identifying that a CC1 signal on a pin A5 or a CC2 signal on a pin B5 of the interface is an earphone detection (DET) signal;
determining that the external device is a device supporting High-Definition Multimedia Interface (HDMI) input, in response to identifying a CC2 signal on a pin B5, a RX1+ signal on a pin B11, a RX1−signal on a pin B10, a TX2+ signal on a pin B32, a TX2−signal on a pin B3, a Vbus3 signal on a pin B4 and a Vbus4 signal on a pin B9, of the interface, or in response to identifying a CC1 signal on a pin A5, a RX2+ signal on a pin A11, a RX2−signal on a pin A10, a TX1+ signal on a pin A2, a TX1− signal on a pin A3, a Vbus1 signal on a pin A4 and a Vbus2 signal on a pin A9, of the interface;
determining that the external device is a charging device, in response to identifying that a CC1 signal on a pin A5, a Vbus1 signal on a pin A4, a Vbus2 signal on a pin A9, a GND1 signal on a pin A1 and a GND2 signal on a pin A12, of the interface, are charging signals, or in response to identifying that a CC2 signal on a pin B5, a Vbus3 signal on a pin B4, a Vbus4 signal on a pin B9, a GND3 signal on a pin B1 and a GND4 signal on a pin B12, of the interface, are charging signals; and
determining that the external device is a data transmission device, in response to identifying a CC1 signal on a pin A5, a D1+ signal on a pin A6, a D1− signal on a pin A7, a SBU1 signal on a pin A8, a Vbus1 signal on a pin A4 and a Vbus2 signal on a pin A9, of the interface, or in response to identifying a CC2 signal on a pin B5, a D2+ signal on a pin B6, a D2− signal on a pin B7, a SBU2 signal on a pin B8, a Vbus3 signal on a pin B4 and a Vbus4 signal on a pin B9, of the interface.

4. The method of claim 1, further comprises displaying remaining power, in response to the external device being a charging device.

5. The method of claim 1, wherein displaying at least one of the applications identified comprises at least one of following steps:
displaying at least one of the applications identified according to an order or a reverse order of user's usage habits;
displaying at least one of the applications identified according to an order or a reverse order of initials of names of the applications identified; and
displaying at least one of the applications identified according to a user-defined sort order.

6. The method of claim 2, wherein identifying an external device connected to an interface according to states of pins of the interface comprises at least one selected from a group consisting of:
determining that the external device is an external storage device, in response to identifying that a CC1 signal on a pin A5 or a CC2 signal on a pin B5 of the interface is pulled down to ground;
determining that the external device is an earphone, in response to identifying that a CC1 signal on a pin A5 or a CC2 signal on a pin B5 of the interface is an earphone detection (DET) signal;
determining that the external device is a device supporting High-Definition Multimedia Interface (HDMI) input, in response to identifying a CC2 signal on a pin B5, a RX1+ signal on a pin B11, a RX1− signal on a pin B10, a TX2+ signal on a pin B32, a TX2− signal on a pin B3, a Vbus3 signal on a pin B4 and a Vbus4 signal on a pin B9, of the interface, or in response to identifying a CC1 signal on a pin A5, a RX2+ signal on a pin A11, a RX2− signal on a pin A10, a TX1+ signal on a pin A2, a TX1− signal on a pin A3, a Vbus1 signal on a pin A4 and a Vbus2 signal on a pin A9, of the interface;
determining that the external device is a charging device, in response to identifying that a CC1 signal on a pin A5, a Vbus1 signal on a pin A4, a Vbus2 signal on a pin A9, a GND1 signal on a pin A1 and a GND2 signal on a pin A12, of the interface, are charging signals, or in response to identifying that a CC2 signal on a pin B5, a Vbus3 signal on a pin B4, a Vbus4 signal on a pin B9, a GND3 signal on a pin B1 and a GND4 signal on a pin B12, of the interface, are charging signals; and
determining that the external device is a data transmission device, in response to identifying a CC1 signal on a pin A5, a D1+ signal on a pin A6, a D1− signal on a pin A7, a SBU1 signal on a pin A8, a Vbus1 signal on a pin A4 and a Vbus2 signal on a pin A9, of the interface, or in response to identifying a CC2 signal on a pin B5, a D2+ signal on a pin B6, a D2− signal on a pin B7, a SBU2 signal on a pin B8, a Vbus3 signal on a pin B4 and a Vbus4 signal on a pin B9, of the interface.

7. The method of claim 2, wherein displaying at least one of the applications identified comprises at least one of following steps:
  displaying at least one of the applications identified according to an order or a reverse order of user's usage habits;
  displaying at least one of the applications identified according to an order or a reverse order of initials of names of the applications identified; and
  displaying at least one of the applications identified according to a user-defined sort order.

8. A non-transitory computer-readable storage medium storing a computer program, wherein the computer program, when executed by a processor, causes the processor to perform a method for obtaining applications, the method comprising:
  identifying an external device connected to an interface according to states of pins of the interface;
  identifying applications which require to use the external device connected to the interface; and
  displaying at least one of the applications identified;
    wherein identifying applications which require to use the external device connected to the interface comprises at least one of following steps:
      determining that the applications which require to use the external storage device are applications to call an online On-The-Go (OTG) function, in response to the external device being an external storage device;
      determining that the applications which require to use the earphone are applications to call an earphone function, in response to the external device being an earphone;
      determining that the applications which require to use a device supporting a HDMI input are applications to call a HDMI function, in response to the external device being a device using a HDMI function;
      determining that the applications which require to use a charging device are N applications with the largest power consumptions, in response to the external device being a charging device; and
      determining that the applications which require to use a data transmission device are applications to call a data transmission function, in response to the external device being a data transmission device.

9. An apparatus for obtaining applications, comprising:
a first determining circuit, configured to identify an external device connected to an interface according to states of pins of the interface;
a second determining circuit, configured to identify applications which require to use the external device connected to the interface; and
a display circuit, configured to display at least one of the applications identified;
  wherein the second determining circuit is further configured to carry out one or more of the following steps:
    determining that the applications which require to use the external storage device are applications to call an online On-The-Go (OTG) function, in response to the external device being an external storage device;
    determining that the applications which require to use the earphone are applications to call an earphone function, in response to the external device being an earphone;
    determining that the applications which require to use a device supporting a HDMI input are applications to call a HDMI function, in response to the external device being a device using a HDMI function;
    determining that the applications which require to use a charging device are N applications with the largest power consumptions, in response to the external device being a charging device; and
    determining that the applications which require to use a data transmission device are applications to call a data transmission function, in response to the external device being a data transmission device.

* * * * *